United States Patent
Kleck et al.

(10) Patent No.: US 7,035,325 B2
(45) Date of Patent: Apr. 25, 2006

(54) JITTER MEASUREMENT USING MIXED DOWN TOPOLOGY

(75) Inventors: Jeffrey A. Kleck, Hillsboro, OR (US); Dan H. Wolaver, Westbrookfield, MA (US); Daniel G. Knierim, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 725 days.

(21) Appl. No.: 09/865,971

(22) Filed: May 25, 2001

(65) Prior Publication Data

US 2002/0176491 A1    Nov. 28, 2002

(51) Int. Cl.
*H04B 17/00* (2006.01)
*H04B 3/46* (2006.01)
*H04L 7/00* (2006.01)

(52) U.S. Cl. ...................... 375/226; 375/371

(58) Field of Classification Search ................ 375/224, 375/226, 371, 373, 376; 370/516
See application file for complete search history.

(56) References Cited

U.S. PATENT DOCUMENTS

| | | | | |
|---|---|---|---|---|
| 5,377,226 A | * | 12/1994 | Davis | 370/342 |
| 5,563,921 A | * | 10/1996 | Mesuda et al. | 375/376 |
| 5,692,009 A | * | 11/1997 | Iijima | 375/226 |
| 5,757,652 A | | 5/1998 | Blazo et al. | |
| 6,127,994 A | * | 10/2000 | Ellis et al. | 345/94 |
| 6,330,452 B1 | * | 12/2001 | Fattouche et al. | 455/456.1 |
| 6,598,004 B1 | * | 7/2003 | Ishida et al. | 702/69 |

OTHER PUBLICATIONS

Roland E. Best, "Phase-Locked Loops—Theory, Design, and Applications", Second Edition, McGraw-Hill, Inc.

* cited by examiner

*Primary Examiner*—Jay K. Patel
*Assistant Examiner*—David B. Lugo
(74) *Attorney, Agent, or Firm*—Francis I. Gray; Matthew D. Rabdau

(57) ABSTRACT

A jitter measurement method using a down-mixing or down-converting topology in a jitter measurement system preserves the jitter UI rather than the jitter seconds. An input serial data stream at a high baud is mixed with a stable local oscillator frequency that is close to that of the high baud. The difference between the high baud and the local oscillator frequency is passed by a filter as a lower rate serial stream. A clock recovery circuit recovers a lower rate clock from the lower rate serial stream, or an amplitude modulation removal stage converts the lower rate serial stream to a lower rate NRZ signal, or the lower rate serial signal is digitized. Jitter measurement is performed by a jitter measurement stage on the lower rate clock, the lower rate NRZ signal, or the digitized lower rate serial signal.

24 Claims, 5 Drawing Sheets

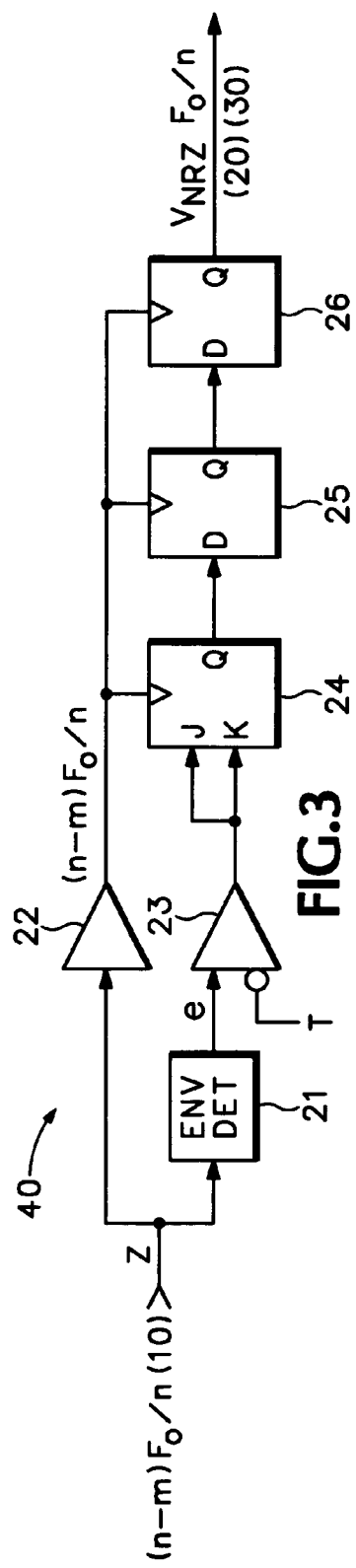
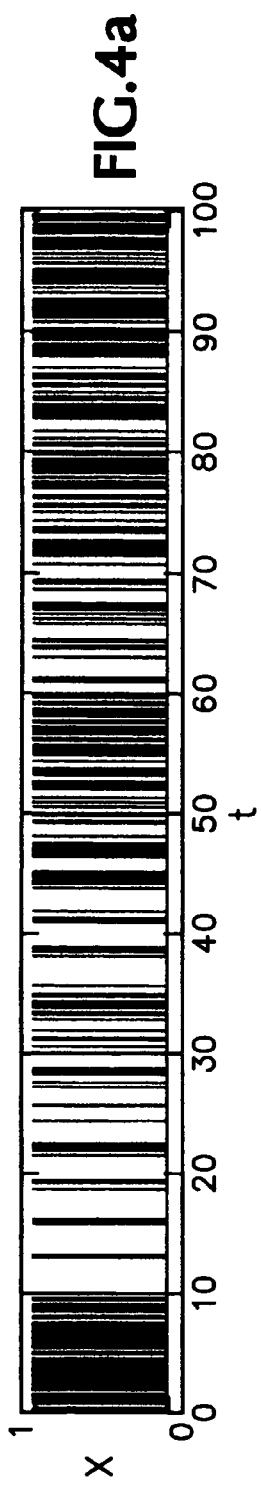
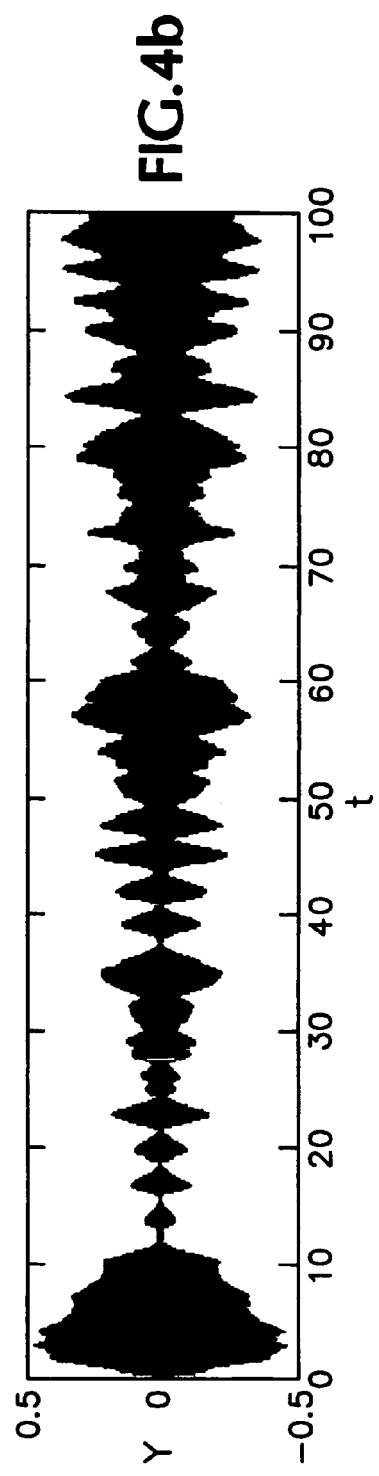

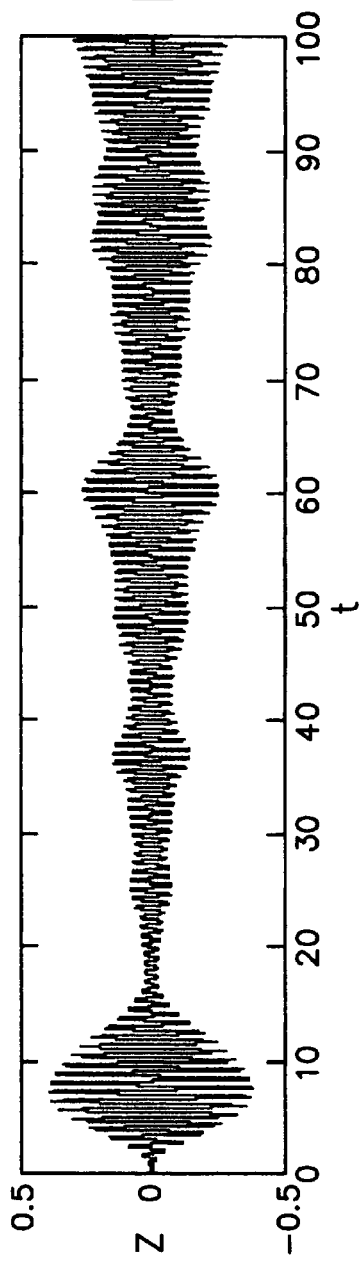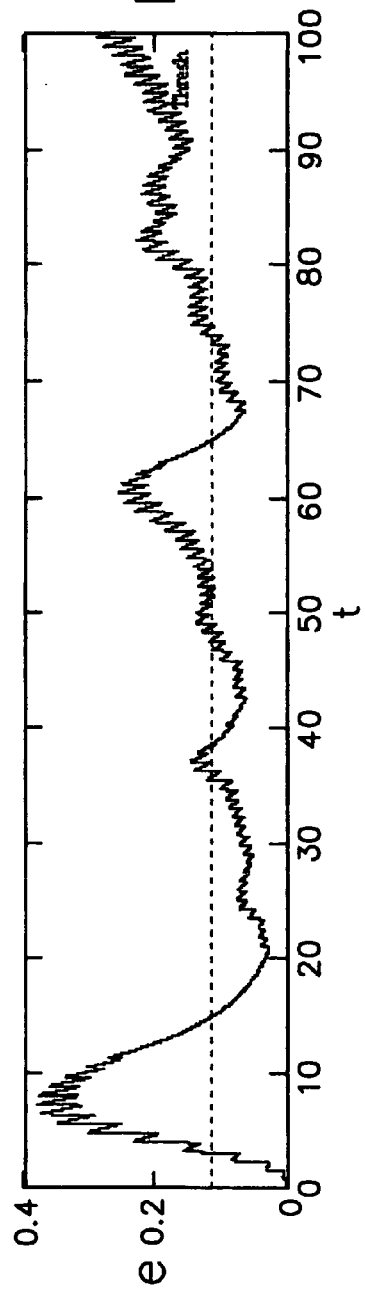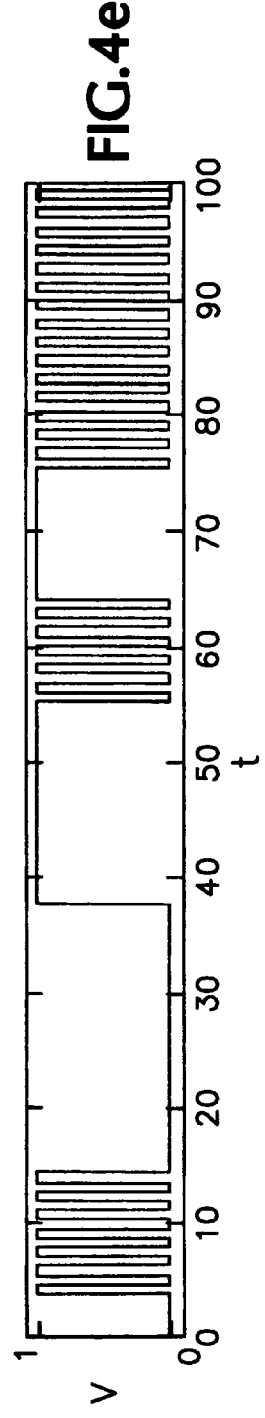

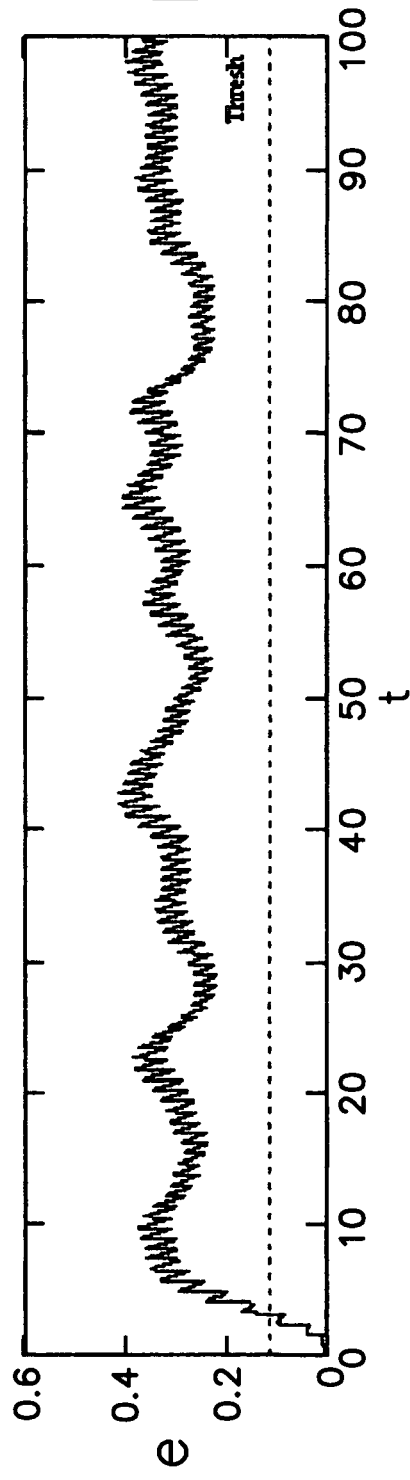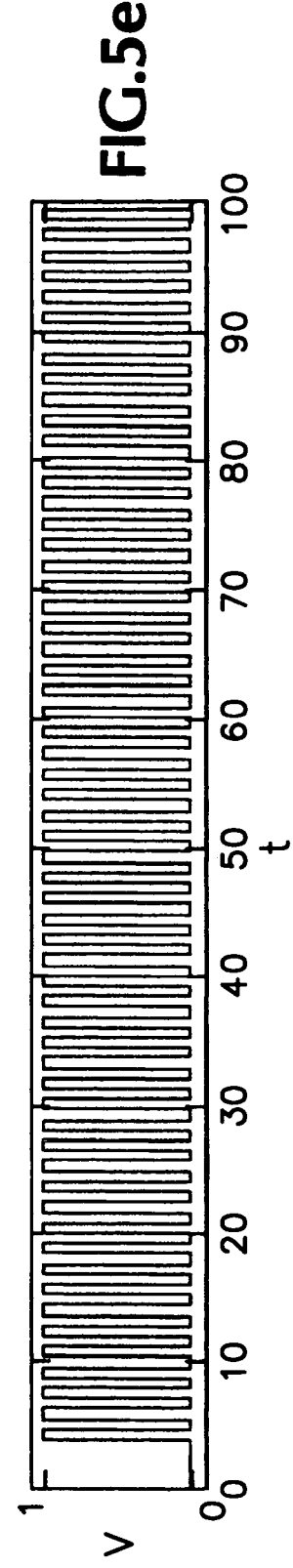

JITTER MEASUREMENT USING MIXED DOWN TOPOLOGY

BACKGROUND OF THE INVENTION

The present invention relates to measuring jitter in digital data, and more particularly to jitter measurement using a mixed down topology.

As serial data stream rates become ever increasing in frequency, it is more difficult to measure the jitter at the serial data baud. Traditional jitter measurement systems first recover the clock from the serial data stream with a wide-band phase-locked-loop (PLL) clock recovery system that preserves the jitter to be measured. The recovered clock is then divided down to some sub-rate clock whose jitter is measured relative to some stable internal reference clock.

Two major drawbacks to this traditional jitter measurement system arise as the serial bauds become faster. First, the ability to recover the clock using a wide-band PLL or an injection-locked oscillator system becomes too costly and the components required to work at these higher clock rates are not readily available. Second, when the higher baud clock is recovered and then divided down, the amount of jitter to be measured in time is maintained. For example if a 10 giga-bits per second (Gb/s) serial data stream has 10 picoseconds (ps) of jitter, i.e., 0.1 UI (Unit Interval=one clock period), and then the recovered clock is divided down to 1 giga-Hertz (GHz), the divided down clock still maintains the 10 ps of jitter from the original 10 GHz recovered clock. The problem now is that the 10 ps relative to the lower speed 1 GHz clock is 0.01 UI. To measure this small amount of jitter requires a jitter measurement system with very low intrinsic jitter.

What is desired is a jitter measurement system that is relatively inexpensive while maintaining the relative jitter as a fraction of the UI during the process when the bauds of the serial data stream are high.

BRIEF SUMMARY OF THE INVENTION

Accordingly the present invention provides a jitter measurement system using a mixed down topology. A serial data stream at a high baud is input to a down converter stage to produce a lower rate serial stream. The down converter stage mixes the serial data stream with a stable local oscillator frequency close to the high baud and passes the difference frequency through a filter as the lower rate serial stream. The UI of any jitter is unchanged by the down conversion process. Clock recovery is performed more easily in a conventional clock recovery stage on the lower rate serial stream, and the jitter of the recovered clock is measured by a conventional jitter measurement stage. Alternatively the lower rate serial stream may be processed by an amplitude modulation removal stage to produce a low rate NRZ signal from which the clock may be recovered or from which jitter may be measured directly. Another alternative where the frequency of the lower rate serial streams warrants is to digitize the lower rate serial stream and then perform clock recovery/amplitude modulation removal/jitter measurement using a digital signal processing (DSP) engine, which may be implemented as a field programmable gate array (FPGA).

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 3 is a block diagram view of an AM removal stage for the jitter measurement system of FIG. 1 according to the present invention.

FIGS. 4a–4e are waveform views at various points in the jitter measurement system of FIGS. 2 and 3 for a worst case condition according to the present invention.

FIGS. 5a–5e are waveform views at various points in the jitter measurement system of FIGS. 2 and 3 for a typical case condition according to the present invention.

DETAILED DESCRIPTION OF THE INVENTION

In the present invention clock recovery from the serial data stream is not performed directly so that expensive components required to run at higher bauds are minimized. Instead the serial data stream is mixed down to a much lower frequency before clock recovery and/or jitter measurement is performed so less expensive components may be used. By mixing down instead of dividing down, the jitter on the data at the higher baud of the serial data stream is multiplied by the mixing ratio for a lower rate serial stream, maintaining the jitter in UI rather than in seconds as in the prior art dividing down technique.

Figure 1:
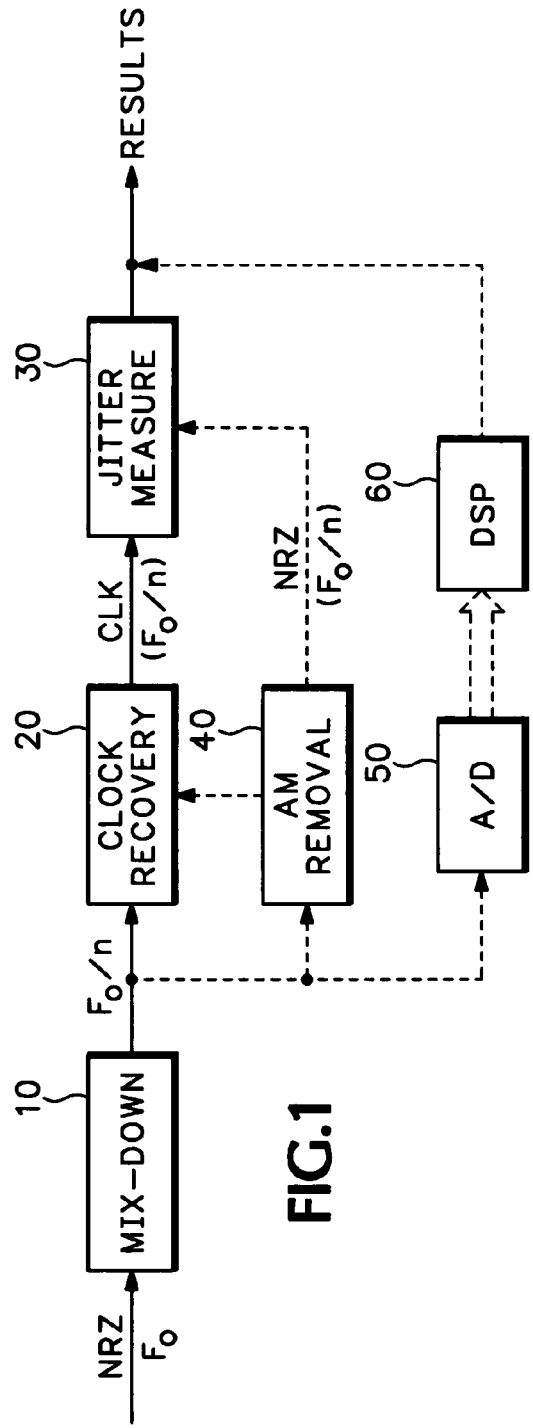
FIG. 1 is a block diagram view of a jitter measurement system according to the present invention showing various alternatives.

Referring now to FIG. 1 a jitter measurement system is shown having a mix-down or down converter stage 10 to produce the lower rate serial stream, which is amplitude modulated, and various alternatives for measuring the jitter from the lower rate serial stream. In one embodiment a conventional clock recovery stage 20, examples of which include injection-locked oscillator circuits and phase-locked loop circuits (examples of which are shown at pages 158–165 of "Phase-Locked Loops" by Roland E. Best, McGraw-Hill, Inc. 1993), is followed by a conventional jitter measurement stage 30 to provide jitter measurement results. In a second embodiment an amplitude modulation removal stage 40 provides a constant amplitude lower rate NRZ signal for input to the conventional clock recovery stage 20 or directly to the conventional jitter measurement stage 30. In yet another embodiment where the frequency of the lower rate serial stream is low enough, it is digitized by an analog-to-digital (A/D) converter 50 to produce digital samples of the lower rate serial stream which in turn are processed by a digital signal processing (DSP) engine 60, which may be implemented as a field programmable gate array (FPGA), to provide the jitter measurement results.

An NRZ serial data stream at a high baud $F_0$ is input to the down converter stage 10. A very stable local oscillator frequency $mF_0/n$, i.e., very low jitter, also is used in the down converter stage 10 to produce a low rate serial stream at $(n-m)F_0/n$, which reduces to $F_0/n$ when $m=n-1$. m and n need not be integers. The down converted low rate serial stream may be input to the clock recovery stage 20 in the first embodiment to recover a reference clock CLK having a frequency of $(n-m)F_0/n$ with the jitter UI maintained. The reference clock is input to the conventional jitter measurement stage 30, such as that described in Section 6 of ITU-T Recommendation O.172, "Jitter and Wander Measuring Equipment for Digital Systems which are based on the Synchronous Digital Hierarchy (SDH)" or in U.S. Pat. No. 5,757,652 "Electrical Signal Jitter and Wander Measurement System and Method", to provide a measure of the jitter in the original serial data stream.

Figure 2:
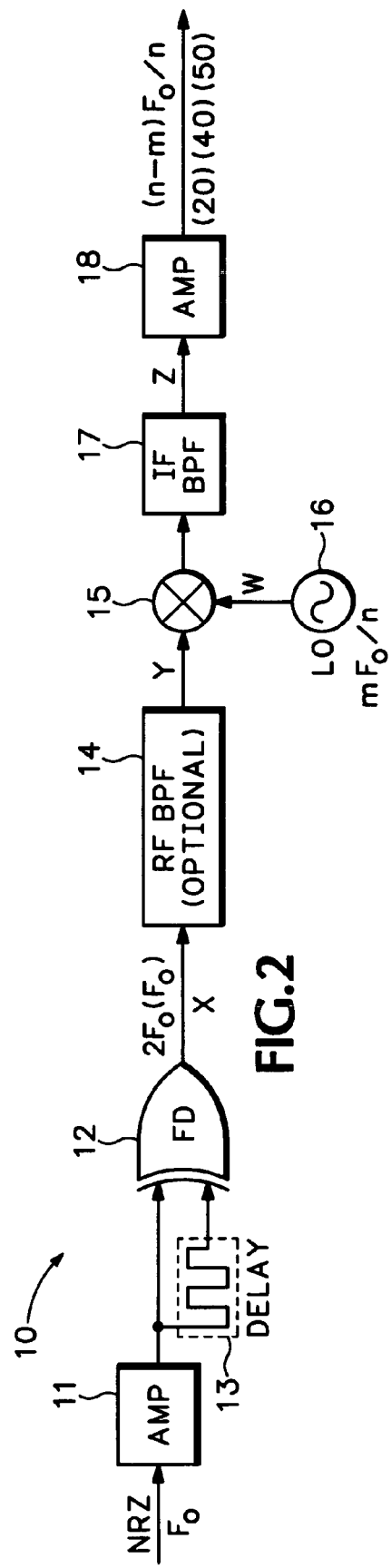
FIG. 2 is a block diagram view of a down converter for the jitter measurement system of FIG. 1 according to the present invention.

FIG. 2 shows the detailed functions within the mix-down or down converter stage 10. The serial data stream, such as a 10 Gb/s NRZ data stream, is input to a buffer amplifier 11 and then to an exclusive-OR gate 12 operating as a frequency doubler (FD). One of the inputs to the exclusive-OR gate 12 is the serial data stream directly from the buffer amplifier 11 and the other input is the serial data stream from the buffer amplifier delayed by a delay circuit 13, where the delay is nominally about 0.5 UI or 50 ps for a 10 Gb/s serial data stream for example. The exclusive-OR gate 12 converts the NRZ serial data stream to an RZ serial data stream where the edges have been converted to 50 ps pulses having a spectral component at $F_0$, or 10 GHz for this example. If the input data stream is already an RZ serial data stream, the exclusive-Or gate 12 and the delay circuit 13 may be bypassed. The RZ serial data stream may be passed through an optional radio frequency (RF) bandpass filter (BPF) 14 to eliminate any aliasing that occurs during the subsequent mixing process. The filtered RZ serial data stream is then input to a mixer stage 15 together with a frequency $mF_0/n$ from a local oscillator 16 which is close in frequency to the high baud, where m=n−1 for this example. The resulting down converted spectral component at $(n-m)F_0/n$ is recovered by an intermediate frequency (IF) BPF 17 to produce a low rate serial stream. The low rate serial stream is input to an output buffer amplifier 18 and provided to the clock recovery stage 20 which for this embodiment has the property of lower phase sensitivity to lower amplitude inputs, to the amplitude modulation removal stage 40 or to the A/D converter 50 depending upon the embodiment being implemented. Any mix ratio may be used, including non-integer values, so long as the local oscillator frequency is further away from the high baud than the jitter bandwidth to be measured to allow room for the RF BPF 14 to roll off the alised frequency band.

For a 10 Gb/s input signal the RZ serial data stream x from the exclusive-OR gate 12 has a strong spectral component at 10 GHz. Where n=8 and m=7, the LO frequency is approximately 8.75 GHz and the mixing products from the mixer stage 15 have strong spectral components at 1.25 GHz and 18.75 GHz. The lower rate serial stream z from the IF BPF 17 passes the 1.25 GHz spectral component via the clock recovery stage 20, the clock recovery being more easily performed at the lower rate, to the jitter measurement stage 30, via the AM removal stage 40 (with or without clock recovery) to the jitter measurement stage, or via the A/D converter 50 to the DSP 60. The lower rate serial stream z is phase modulated by the jitter of the NRZ serial data stream and is amplitude modulated by the random data bits in the NRZ serial data stream.

The RZ serial data stream has a component at the high frequency rate $F_0$ plus odd-symmetric phase-modulation sidebands (the jitter to be measured) and even-symmetric amplitude-modulation sidebands (due to the random data bit pattern). The sidebands near the high baud retain their symmetries through the mixing process, so the amplitude modulation may be rejected by the clock recovery system 20. However the amplitude-modulation sideband (at $\frac{3}{4} F_0$ where n=8 and m=7) aliases on top of the desired sidebands in the mixing process, and thus is not rejected after the mixing process. The purpose of the RF bandpass filter 14 is to reject the aliasing amplitude-modulation sideband before the mixing process.

In the AM removal stage 40, as shown in FIG. 3, the lower rate serial stream z is input to an envelope detector 21 and a threshold comparator 23 to determine when the amplitude of z is large enough to provide reliable phase information. The phase information becomes unreliable when the amplitude of z is low, causing the slope of the voltage waveform to become small, which together with noise may introduce spurious jitter. For example when z is a 1.25 GHz sinusoid with 800 mV peak-to-peak, the slope at the zero crossings is 6.3 mV/ps. Then 1 mV of added noise moves the zero crossing by only $\frac{1}{6.3}$=0.16 ps. But if the sinusoidal amplitude falls to 80 mV peak-to-peak due to amplitude modulation, the same noise moves the zero crossings by 1.6 ps, which is 0.016 UI at 10 Gb/s. The threshold detector 23 prevents the low amplitude sinusoid part of z from producing edges at the output. The lower rate serial stream z also is input to another comparator 22 that converts it to a square-wave signal with edges at the zero-crossing locations. When the envelope detector 21 and threshold comparator 23 determine that the phase information is reliable, the squared-up z clocks a toggle flip-flop 24 to produce a $(n-m)F_0/n$ baud NRZ signal. Additional D-type flip-flops 25, 26 may be used to work out any metastability. The reduced-frequency NRZ signal from the final flip-flop 26 is measured for jitter by the conventional jitter measurement stage 30 or is input to the conventional clock recovery stage 20. Not all conventional clock recovery systems handle amplitude modulated signals well: an injection-locked oscillator system or a PLL system with a mixer-based phase detector may do a good job of reducing phase sensitivity to low amplitude sections of z, but a PLL using a "digital" phase detector (one that treats the incoming signal as just a bunch of edges) is too sensitive to noise-induced jitter during periods of low amplitude input. Therefore the conventional clock recovery system used for the clock recovery stage 20 depends on whether the input signal has low amplitude sections or not.

Figure 5A:
Figure 5B:
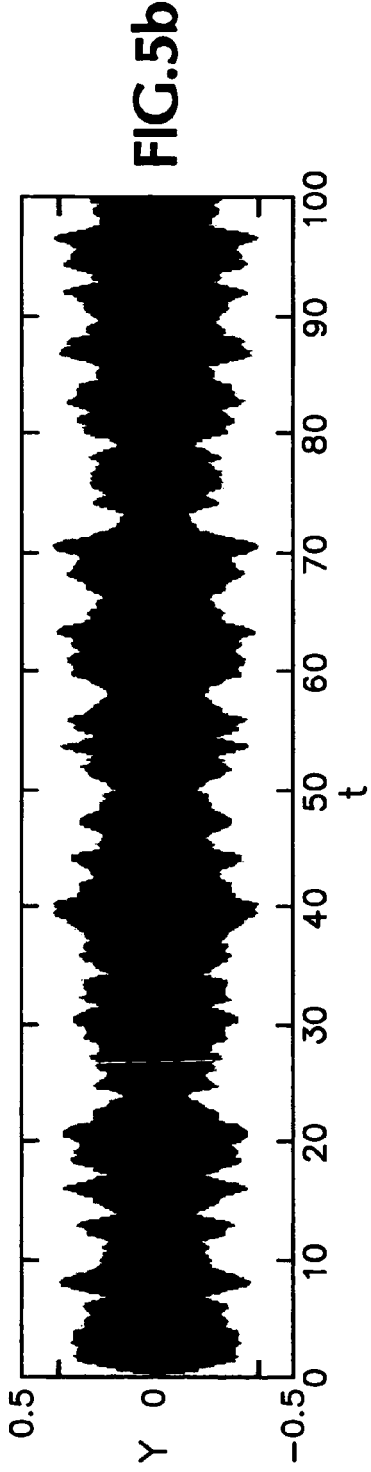

As shown in FIGS. 4a and 5a the RZ serial data stream x which is to be down-converted as shown in FIG. 2 has a pulse density that varies from the worst case scenario of FIG. 4a to the typical scenario of FIG. 5a. If x is represented as an AM signal:

$$x=c(t)^* \cos(\omega_1 t)$$

where c(t) is an envelope that is either 1 or 0 and $\omega_1$ is $2\pi F_0$, i.e., the radian frequency of the NRZ baud (see FIGS. 4a and 5a), then the output y of the RF BPF 14 is:

$$y=d(t)^* \cos(\omega_1 t+\theta)$$

where d(t) is a low-passed version of c(t) (see FIGS. 4b and 5b). The output of the local oscillator 16 is:

$$w=\cos(\omega_2 t)$$

where $\omega_2$ is $2\pi m F_0/n$. The output of the mixer 15 is the product y*w:

$$d(t)^* \cos(\omega_1 t+\theta)^* \cos(\omega_2 t)=0.5d(t)[\cos((\omega_1+\omega_2)t+\theta)\\+\cos((\omega_1-\omega_2)t+\theta]$$

Figure 5C:
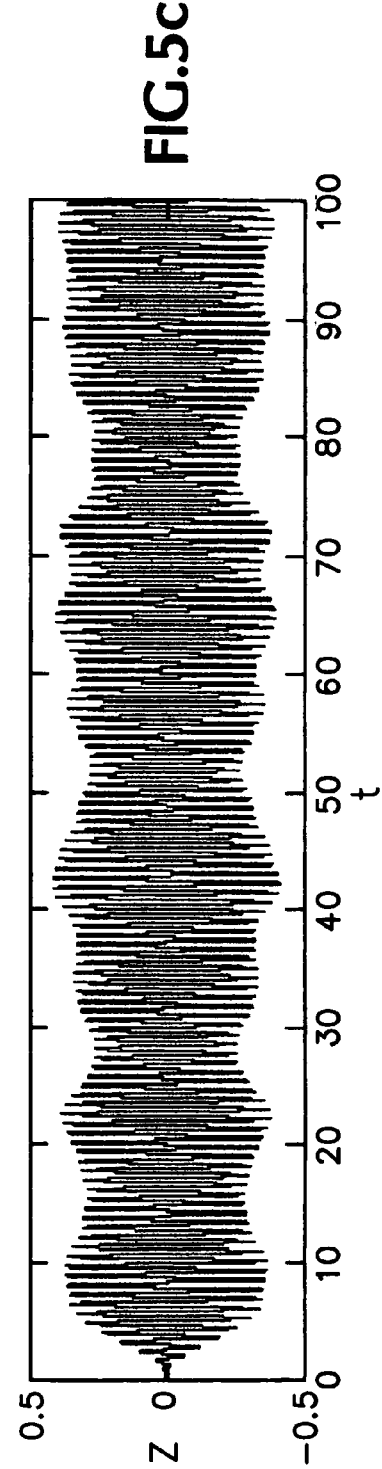

The output from the IF BPF 17 is the low frequency component:

$$z=e(t)^* \cos((\omega_1-\omega_2)t+\theta)$$

where e(t) is the low-passed version of 0.5d(t) and $\omega_1-\omega_2=2\pi(n-m)F_0/n$ (see FIGS. 4c and 5c).

The envelope e(t) (see FIGS. 4d and 5d) is recovered by the envelope detector 21 of FIG. 3. When e(t) is greater than the threshold T, then the flip-flop 24 toggles on the squared-up z clock (see flip-flop output v in FIGS. 4e and 5e). When e(t) is less than the threshold T, the flip-flop 24 holds the last value. v is an NRZ waveform with a baud of $(n-m)F_0/n$. The jitter of v has the same amplitude in UI at the frequency $(n-m)F_0/n$ as the jitter amplitude of x in UI at the frequency $F_0$. In other words the jitter in picoseconds is amplified by a factor of $n/(n-m)$. For $F_0=10$ GHz, n=8 and m=7, if the jitter amplitude of x is 0.02 UI, or 2 ps, then at $(n-m)F_0/n=1.25$ GHz the jitter amplitude of v is 0.02 UI, or 2*8=16 ps.

The digital embodiment of the mixed-down jitter measurement system including the A/D converter 50 and DSP 60, although possibly more expensive, provides more flexibility. Besides performing the amplitude modulation removal comparable to FIG. 3 and the convention jitter measurement comparable to the jitter measurement stage 30, it may also compensate for non-linearities in the down-conversion process, which may introduce amplitude and then phase modulation errors, as well as provide a graduated weighting of the lower rate serial stream to recover some of the information contained in the low amplitude sections, rather than the all or nothing weighting implemented by the threshold comparator 23.

An additional drawback of traditional jitter measurement systems is the difficulty of adjusting the system to cover different data rates, i.e., to cover both the data signal baud (9.953 GB/s for Sonet) and the data signal plus error correction overhead baud (10.664 GB/s for OTN). This difficulty arises from the need to tune the high-speed clock-recovery oscillator while maintaining the desired PLL or IF bandwidth. However the baud of the present down-mixing architecture may be tuned by changing either the LO frequency, which is likely controlled by an easier-to-design narrow-band PLL, or by tuning the lower-frequency IF BPF 17, or both. Therefore for moderately small baud changes as indicated above, the high-frequency elements, such as the delay 13 and the RF BPF 14, need not be tunable. This makes an adjustable baud jitter measurement system at high bauds practical.

Thus the present invention provides a jitter measurement system that mixes down the frequency of the input serial data stream at a high baud rate to produce a lower rate serial stream, the down-converting maintaining the UI for the jitter amplitude between the higher and lower rate signals, that processes the lower rate serial stream either by clock recovery to produce a lower rate clock, by amplitude modulation removal to produce a lower rate NRZ signal which may or may not be used for clock recover, or by digitizing, and that recovers either from the lower rate clock, the lower rate NRZ signal or the digitized lower rate serial stream the jitter measurement using conventional means.

What is claimed is:

1. A jitter measurement system for a serial data stream having a high baud comprising:
    means for down converting the serial data stream to a low rate serial stream; and
    means for measuring jitter from the low rate serial stream, the jitter in UI (one UI equals one clock period) being the same for the low rate serial stream as for the serial data stream wherein the means for measuring comprises:
    means for recovering a low rate clock from the low rate serial stream; and
    means for measuring the jitter from the low rate clock.

2. A jitter measurement system for a serial data stream having a high baud comprising:
    means for down converting the serial data stream to a low rate serial stream; and
    means for measuring jitter from the low rate serial stream, the jitter in UI (one UI equals one clock period) being the same for the low rate serial stream as for the serial data stream, wherein the means for measuring comprises:
    means for recovering a low rats NRZ signal from the low rate serial stream; and
    means for measuring the jitter from the low rate NRZ signal.

3. The jitter measurement system as recited in claim 2 wherein the recovering means comprises:
    means for generating a phase signal indicating when the law rate serial stream provides meaningful phase information; and
    means for clocking the low rate serial stream as a function of the phase signal with a clocking signal derived from the law rate serial stream to produce the low rate NFZ signal.

4. The jitter measurement system as recited in claim 3 wherein the generating means comprises:
    means for detecting an envelope of the low rate serial stream; and
    means for comparing the envelope with a threshold to produce the phase signal.

5. The jitter measurement system as recited in claim 4 wherein the comparing means comprises a comparator having the threshold and the envelope as inputs and providing the phase signal as an output.

6. The jitter measurement system as recited in claim 3 wherein the clocking means comprises:
    means for converting the low rate serial stream to the clocking signal; and
    means for toggling between two states in response to the clocking signal when the phase signal indicates meaningful phase information while holding a last state when the phase signal indicates no meaningful phase information to produce the low rats NRZ signal.

7. The jitter measurement system as recited in claim 6 wherein the converting means comprises means for squaring up the low rate serial stream to produce the clocking signal.

8. The jitter measurement system as recited in claim 7 wherein the squaring up means comprises means for comparing the low rate serial stream with a threshold at a zero crossing level for the low rate serial stream to produce the clocking signal.

9. The jitter measurement system as recited in claim 6 wherein the toggling means comprises a toggle/hold flip-flop having the phase signal as a data input and the clocking signal as a clock input and having the low rate NRZ signal as an output.

10. The jitter measurement system as recited in claim 2 wherein the measuring means comprises:
    means for digitizing the lower rate serial stream to produce a sampled serial stream; and
    means for processing the sampled serial stream to measure jitter.

11. The jitter measurement system as recited in any one of claims 1–10 further comprising means for converting an NRZ serial data stream to an RZ serial data stream, the RZ serial data stream being the serial data stream input to the down converting means.

12. The jitter measurement system as recited in claim 11 wherein the converting means comprises:
    means for delaying the serial data stream to produce a delayed serial data stream; and
    means for combining the delayed serial data stream and the serial data stream to convert the NRZ serial data stream to the RZ serial data stream.

13. The jitter measurement system as recited in claim 12 wherein the delaying means comprises a delay circuit having the serial data stream as an input and me delayed serial data stream as an output, the delay circuit providing a delay equal to approximately one-half of a period of the high baud rate.

14. The jitter measurement system as recited in claim 12 wherein the combining means comprises an exclusive-OR gate having the serial data stream and the delayed serial data stream as inputs and having the serial data stream in the RZ format as an output.

15. The jitter measurement system as recited in claim 14 wherein the delaying means comprises a delay circuit having the serial data stream as an input and the delayed serial data stream as an output, the delay circuit providing a delay equal to approximately one-half of a period of the high baud rate.

16. The jitter measurement system as recited in any one of claims 1–10 wherein the down converting means comprises:
    means for mixing the serial data stream with a local oscillator signal having a frequency near the high baud to provide a spectrum of mixed serial data streams; and
    means for selecting the low rate serial stream from the spectrum of mixed serial data streams.

17. The jitter measurement system as recited in claim 16 wherein the mixing means comprises a mixer having the serial data stream and the local oscillator signal as inputs and having the spectrum of mixed serial data streams as an output.

18. The jitter measurement system as recited in claim 16 wherein the selecting means comprises an intermediate frequency bandpass filter having the spectrum of mixed serial data streams as an input end the low rate serial stream as an output.

19. The jitter measurement system as recited in claim 18 wherein the mixing means comprises a mixer having the serial data stream and the local oscillator signal as inputs and having the spectrum of mixed serial data streams as an output.

20. The jitter measurement system as recited in claim 16 wherein the frequency of the local oscillator signal is tunable to adjust the jitter measurement system to accommodate a range of high bauds for the serial data stream.

21. The jitter measurement system as recited in claim 20 wherein a center frequency for the selecting means is tunable to adjust the jitter measurement system to accommodate a range of high baud rates for the serial data stream.

22. The jitter measurement system as recited in claim 16 wherein a center frequency for the selecting means is tunable to adjust the jitter measurement system to accommodate a range of high baud rates for the serial data stream.

23. The jitter measurement system as recited in any one of claims 1–10 further comprising means for anti-alias filtering the serial data stream to produce an anti-aliased serial data stream for input to the down converting means.

24. The jitter measurement system as recited in claim 23 wherein the anti-alias filtering means comprises a radio-frequency filter having the serial data stream as an input and the anti-aliased serial data stream as an output, the radio-frequency filter being configured to filter out an amplitude-modulation sideband that otherwise aliases on top of desired sidebands in the down converting means.

* * * * *